US009386027B2

(12) United States Patent
Xing et al.

(10) Patent No.: US 9,386,027 B2
(45) Date of Patent: Jul. 5, 2016

(54) DETECTION OF PILEUP VULNERABILITIES IN MOBILE OPERATING SYSTEMS

(71) Applicant: Indiana University Research and Technology Corporation, Indianapolis, IN (US)

(72) Inventors: Luyi Xing, Bloomington, IN (US); XiaoFeng Wang, Bloomington, IN (US)

(73) Assignee: Indiana University Research & Technology Corporation, Indianapolis, IN (US)

( * ) Notice: Subject to any disclaimer, the term of this patent is extended or adjusted under 35 U.S.C. 154(b) by 0 days.

(21) Appl. No.: 14/456,719

(22) Filed: Aug. 11, 2014

(65) Prior Publication Data

US 2016/0044049 A1 Feb. 11, 2016

(51) Int. Cl.
*H04L 29/06* (2006.01)
(52) U.S. Cl.
CPC ...................................... *H04L 63/14* (2013.01)
(58) Field of Classification Search
CPC ....... G06F 21/57; G06F 21/53; G06F 21/577; H04L 63/1433
USPC .......................................................... 726/23
See application file for complete search history.

(56) References Cited

U.S. PATENT DOCUMENTS

| 2002/0026591 | A1* | 2/2002 | Hartley | ............... H04L 63/1433 726/25 |
| 2007/0143851 | A1* | 6/2007 | Nicodemus | ............. G06F 21/55 726/25 |
| 2013/0212709 | A1* | 8/2013 | Tucker | .................... G06F 21/55 726/29 |
| 2014/0359777 | A1* | 12/2014 | Lam | ...................... G06F 21/577 726/25 |
| 2015/0220455 | A1* | 8/2015 | Chen | ................... G06F 12/1466 711/163 |

OTHER PUBLICATIONS

Xing, L., Pan, X., Wang, R., Yuan, K., & Wang, X. (May 2014). Upgrading your android, elevating my malware: Privilege escalation through mobile os updating. In Security and Privacy (SP), 2014 IEEE Symposium on (pp. 393-408). IEEE.*

Zhang, J., Yang, X., Li, T., & Bao, J. (May 2014). A detection system of Android application based on permission analysis. In Communications Security Conference (CSC 2014), 2014 (pp. 1-6). IET.*

(Continued)

*Primary Examiner* — Syed Zaidi
(74) *Attorney, Agent, or Firm* — Leydig, Voit & Mayer, Ltd.

(57) ABSTRACT

A system is provided for detecting pileup vulnerabilities corresponding to mobile operating system updates. The system includes: an exploit opportunity analyzer, configured to identify pileup exploit opportunities corresponding to a plurality of mobile operating system configurations based on mobile operating system upgrades for each of the plurality of mobile operating system configurations, wherein the identification of exploit opportunities is based on information relating to pileup flaws; a risk database, configured to store information regarding the identified pileup exploit opportunities for a plurality of versions of each of the plurality of mobile operating system configurations; and a scanner application, configured to be executed by a mobile device, configured to query identified exploit opportunities relating to a particular mobile operating system configuration and version, and to evaluate third-party applications installed at the mobile device based on the identified exploit opportunities.

20 Claims, 9 Drawing Sheets

(56) References Cited

OTHER PUBLICATIONS

Bugiel, Sven, et al. "Towards Taming Privilege-Escalation Attacks on Android." NDSS. 2012.*
Vidas, Timothy, Daniel Votipka, and Nicolas Christin. "All Your Droid Are Belong to Us: A Survey of Current Android Attacks." WOOT. 2011.*
Zhang, M., & Yin, H. (Feb. 2014). Appsealer: Automatic generation of vulnerability-specific patches for preventing component hijacking attacks in android applications. In Proceedings of the 21th Annual Network and Distributed System Security Symposium (NDSS 2014).*
*Android Developers*, retrieved on Jan. 22, 2015 from http://source.android.com/.
*Android Distribution*, Droid Life retrieved on Jan. 22, 2015 from http://www.droid-life-com/tag/distribution.
*Android Fragmentation*, retrieved on Jan. 22, 2015 from http://www.opensignal.com/reports/fragmentation-2013/.
*Android Version History* retrieved on Jan. 22, 2015 from http://en.wikip[edia.org/wiki/Android_version_history.
*Factory Images for Nexus Devices* retrieved on Jan. 22, 2015 from http://developers.google.com/android/nexus/images.
*Google Cloud Messaging* retrieved on Jan. 22, 2015 from http://developers.android.conn/reference/com/google/android/gms/gcm/GoogleCloudMessaging.html.
*Google Play Services* retrieved on Jan. 22, 2015 from https://play.google.com/store/apps/detao;s?id=com.google.android.gms.
*HTCdev.* retrieved on Jan. 22, 2015 from http://www.htcdev.com/devcenter/downloads/P00.
*Norton Security Antivirus* retrieved on Jan. 22, 2015 from https://play.google.com/store/apps/details?id=com.symantec.mobilesecurity&hl=en.
*One Billion Android Devices* retrieved on Jan. 22, 2015 from http://www.technologgyreview.com/graphiti/520491/mobile-makeover/.
*OpenSource Code Distribution* retrieved on Jan. 22, 2015 from http://www.lg.com/global/support/opensource/index.
*Permission Tree* retrieved on Jan. 22, 2015 from http://developer.android.com/guide/topics/manifest/permission-tree-element.html.
*Samsung Open Source* retrieved on Jan. 22, 2015 from http://opensource.samsung.com/.
*Samsung Updates* retrieved on Jan. 22, 2015 from http://Samsung-updates.com/.
*Shared UID* retrieved on Jan. 22, 2015 from http://developer.android.com/guide/topics/manifest/mainifest-element.html#uid.
*VeriFast* retrieved on Jan. 22, 2015 from http://people.cs.kuleuven.bel~bart.jacobs.verifast.
Arora, A., et al., "Impact of Vulnerability Disclosure and Patch Availability—An Empirical Analysis", in *Third Workshop on the Economics of Information Security*, 2004.
Ball, T., et al., "Thorough Static Analysis of Device Drivers", *ACM SIGOPS Operating Systems Review*, 2006.
Barnett, M., et al., "Boogie: A modular Reusable Verifier for Object-Oriented Programs", *Formal Method for Components and Objects*, Springer 2006.
Barrera, D., et al., "A Methodology for Empirical Analysis of Permission—Based Security Models and its Application to Android", *The 17$^{th}$ ACM Conference on Computer and Communications Security, CCS '10, ACM*, 2010.
Biere, A., et al., "Bounded Model Checking", *Advances in computers*, 2003.
Brumley, D., et al., "Automatic Patch-Based Exploit Generation is Possible: Techniques and Implications", in *IEEE Symposium on Security and Privacy*, 2008.
Csallner, C., et al., "Check 'n' Crash: Combining Static Checking and Testing", *The 27$^{th}$ International Conference on Software Engineering, ACM*, 2005.
Cui, W., et al., "ShieldGen: Automatic Data Patch Generation for unknown Vulnerabilities with Informed Probing", *In Security and Privacy, IEEE*, 2007.
Davi, L., et al., "Privilege Escalation Attacks on Android", *In information Security*, Springer, 2011.
Dietz, M., et al., "Quire: Lightweight Provenance for Smart Phone Operating Systems", *USENIX Security Symposium*, 2011.
Enck, W., et al., TaintDroid: An information-Flow Tracking System for Realtime Privacy Monitoring on Smartphones, *OSDI*, 2010.
Enck, W., et al., "A study of Android Application Security", *USENIX Security Symposium*, 2011.
Felt, A.P., et al., "Permission Re-Delegation: Attacks and Defenses", *USENIX Security Symposium*, 2011.
Gilbert, P., et al., "Vision: Automated Security Validation of Mobile Apps at App Markets", *The Second International Workshop on Mobile Cloud Computing and Service, ACM*, 2011.
Grace, M., et al., "Systematic Detection of Capability Leaks in Stock Android Smart-Phones", *The 19$^{th}$ Annual Symposium on Network and Distributed System Security*, 2012.
Jacobs, B., et al., "The VeriFast Program Verifier", *CW Reports*, 2008.
Oh, J., "Fight against 1-day exploits: Diffinq Binaries vs Anti-Diffing Binaries", *Blackhat Technical Security Conference*, 2009.
Sellwood, J., et al., "Sleeping Android: Exploit through Dormant Permission Requests", 3$^{rd}$ *Annual ACM CCS Workshop on Security and Privacy in Smart-phones and Mobile Devices* (SPSM), 2013.
Schrittwieser, S., et al., "Guess Who's Texting You? Evaluating the Security of Smartphone Messaging Applications", the *19$^{th}$ Annual Symposium on Network and distributed System security*, 2012.
Wang, R., et al., "Unauthorized Origin Crossing on Mobile Platforms: Threats and Mitigation", the *20$^{th}$ ACM conference on Computer and Communications Security*, ACM 2013.
Wright, C., et al., "Linux Security Modules: General Security Support for the Linux Kernel", *USENIX Security Symposium*, 2012.
Yang, J., et al., "Safe to the Last Instruction: Automated Verification of Type-Safe Operating System", in *ACM Sigplan Notices*, 2010.
Xing, Luyi, et al., "Upgrading Your Android, Elevating My Malware: Privilege Escalation Through Mobile Os Updating", *Accepted by the 35$^{th}$ IEEE Symposium on Security and Privacy*, San Jose CA, May 2014.
Pile Up Supporting Materials. Retrieved from http://sites.google.com/site/pileupieesp/.
Engler, Dawson, et al., "Static Analysis versus Software Model Checking for Bug Finding", *In Verification Model Checking and Abstract Interpretation*, Springer 2004.
Lev-Ami, et al., "TVLA: A System for Implementing Static Analyses", *In Static Analysis*, pp. 280-301, Springer 2000.
Howard, et al., "Inside the Windows Security Push", *Security & Privacy, IEEE*, 2003.
Bjesse, Per, et al., "Finding Bugs in an Alpha Microprocessor Using Satisfiability Solvers", *In Computer Aided Verification*, 2001.
Schlegel, R., et al., "Soundcomber: A Stealthy and Context-Aware Sound Trojan for Smartphones", *The 18$^{th}$ Annual Symposium on Network and Distributed System Security*, 2011.
Android Permission. http://developer.anddroid.com/reference/android/R/styleable.htm#AndroidManifestPermission_protectionLevel. (Document unavailable).
Beckert, B., et al., "Verification of object-oriented software: The KeY approach", *Springer-Verlag*, 2007. (Document unavailable).

* cited by examiner

DETECTION OF PILEUP VULNERABILITIES IN MOBILE OPERATING SYSTEMS

STATEMENT REGARDING FEDERALLY SPONSORED RESEARCH AND DEVELOPMENT

This invention was made with Government support under Grant Numbers CNS1117106 and CNS1223495 awarded by the National Science Foundation. The Government has certain rights in this invention.

BACKGROUND

Mobile operating systems (OSes) for mobile devices (e.g., smartphones) evolve quickly. For at least some mobile OSes, major updates or new overhauls of entire systems are made available as often as once every few months, bringing brand new mobile device applications (apps) and enriched functionalities with each update. Conventional wisdom is that such a vibrant ecosystem benefits the mobile device users, providing enhanced security by plugging loopholes in a timely manner, as well as providing enhanced functionality.

Indeed, for years, major smartphone vendors and system/software developers have leveraged convenient updating mechanisms on mobile devices to push out fixes and enhance existing protection. Such updates are becoming increasingly frequent (e.g., with respect to the Android mobile OS, the first 19 major updates occurred on average about once every 3.4 months) and increasingly complicated (e.g., hundreds of apps being added or replaced each time by hundreds of different Android device vendors).

SUMMARY

Embodiments of the invention relate to detection of vulnerabilities associated with the updating process for mobile OSes. Due to the frequency of mobile OS updates, fragmentation of mobile OSes (i.e., existence of many different versions of the mobile OS co-existing at the same time, including multiple iterations of a particular mobile OS, and further including vendor-customized versions of a mobile OS), as well as the complicated nature of mobile OS updates often involving replacement and/or addition of tens of thousands of files on a live system, the mobile OS updating process presents an opportunity for malicious software (malware) to exploit security loopholes.

Specifically, embodiments of the invention focus on detection of security-critical vulnerabilities associated with a mobile OS update, referred to herein as "pileup" (privilege escalation through updating) flaws, through which a malicious app can potentially escalate its privileges, acquire system and signature permissions, determine settings (e.g., protection levels), substitute itself for new system apps, contaminate system app data (e.g., the cache and cookies of a system's default web browser), steal sensitive user information, change the user's security configurations, prevent installation of critical system services, etc. Pileup attacks are not aimed at the currently installed mobile OS, but rather utilize vulnerabilities in an updating mechanism for the mobile OS that allows a malicious app to perform unauthorized activity on or otherwise affect a future, updated iteration of the mobile OS.

In an embodiment, the invention provides a system for detecting pileup vulnerabilities corresponding to mobile operating system updates. The system includes: an exploit opportunity analyzer, configured to identify pileup exploit opportunities corresponding to a plurality of mobile operating system configurations based on mobile operating system upgrades for each of the plurality of mobile operating system configurations, wherein the identification of exploit opportunities is based on information relating to pileup flaws; a risk database, configured to store information regarding the identified pileup exploit opportunities for a plurality of versions of each of the plurality of mobile operating system configurations; and a scanner application, configured to be executed by a mobile device, configured to query identified exploit opportunities relating to a particular mobile operating system configuration and version, and to evaluate third-party applications installed at the mobile device based on the identified exploit opportunities.

BRIEF DESCRIPTION OF THE SEVERAL VIEWS OF THE DRAWINGS

The invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Before getting into the details of embodiments of the invention, it is helpful to understand various manners in which pileup attacks are possible as a result of security vulnerabilities in a mobile OS update process in the context of an exemplary environment. It will be appreciated that the environment and embodiments described below are exemplary, and that variations of such environment and embodiments are also possible without departing from the principles of the invention.

Figure 1:
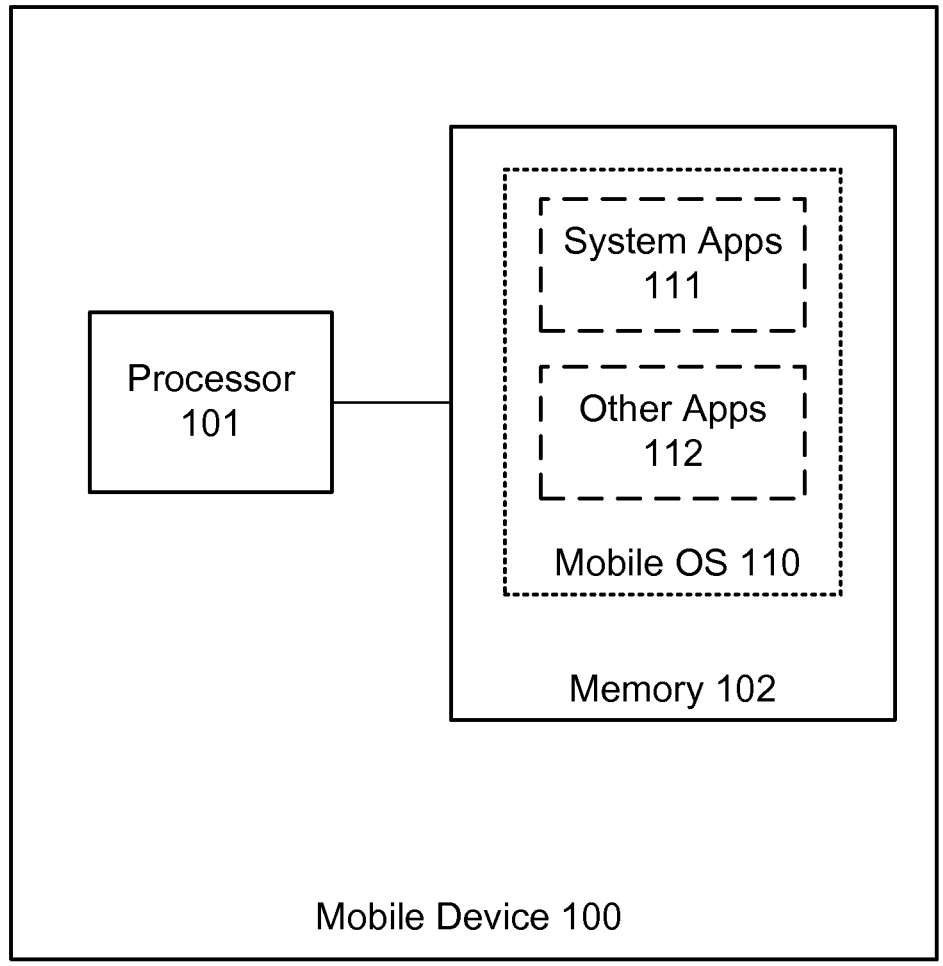
FIG. 1 is a simplified block diagram illustrating components of a mobile device in an exemplary environment.

FIG. 1, which illustrates an exemplary environment in which principles of the invention are applicable, depicts a simplified schematic of a mobile device 100 (e.g., a smartphone), that includes a processor 101 and a memory 102, with the memory having installed thereon a mobile OS 110. The processor 101 is configured to execute processor-executable instructions stored on the memory associated with the mobile OS so as to facilitate execution of various system apps 111 (e.g., relating to e-mail, web browsing, camera, calendar, certain data storage, etc.) and third-party apps 112 (e.g., apps downloaded from third-party vendors and developers from an app store or other repository). It will be appreciated that the mobile device may further include many other components (e.g., power supply, touchscreen display, speakers, satellite-based positioning unit, wireless communications transceivers, communication ports, etc.), but such other components are omitted from the depiction of FIG. 1 for simplicity.

In an exemplary embodiment, each app exists within its own "sandbox" and has its own set of permissions and privileges within the system, as well as its own location for data storage associated with the app. An exception to this general rule is that certain apps may possess a shared user ID (UID), which allows the OS to assign multiple apps to the same UID and allows the apps to access each other's data and potentially execute in a same process. Two apps having a shared UID should be signed by the same party, and have a declaration in their manifests identifying their shared UID.

FIGS. 2A-2E are flowcharts illustrating different ways that malicious apps may exploit pileup vulnerabilities to perform pileup attacks on the mobile device depicted in FIG. 1 via an upgrade of the mobile OS. The discovery by the inventors of the present invention of these pileup flaws corresponding to mobile OS upgrades is described with additional details and examples, in the context of the Android mobile OS, in Luyi Xing et al., "Upgrading Your Android, Elevating My Malware: Privilege Escalation through Mobile OS Updating," presented at the 35th IEEE Symposium on Security and Privacy, San Jose, Calif. (May 2014) (available online at http://www.ieee-security.org/TC/SP2014/papers/UpgradingYourAndroid,ElevatingMyMalware_c_PrivilegeEscalationThroughMobileOSUpdating.pdf), which is incorporated by reference herein in its entirety and referred to herein after as "the Xing Publication."

Figure 2A:
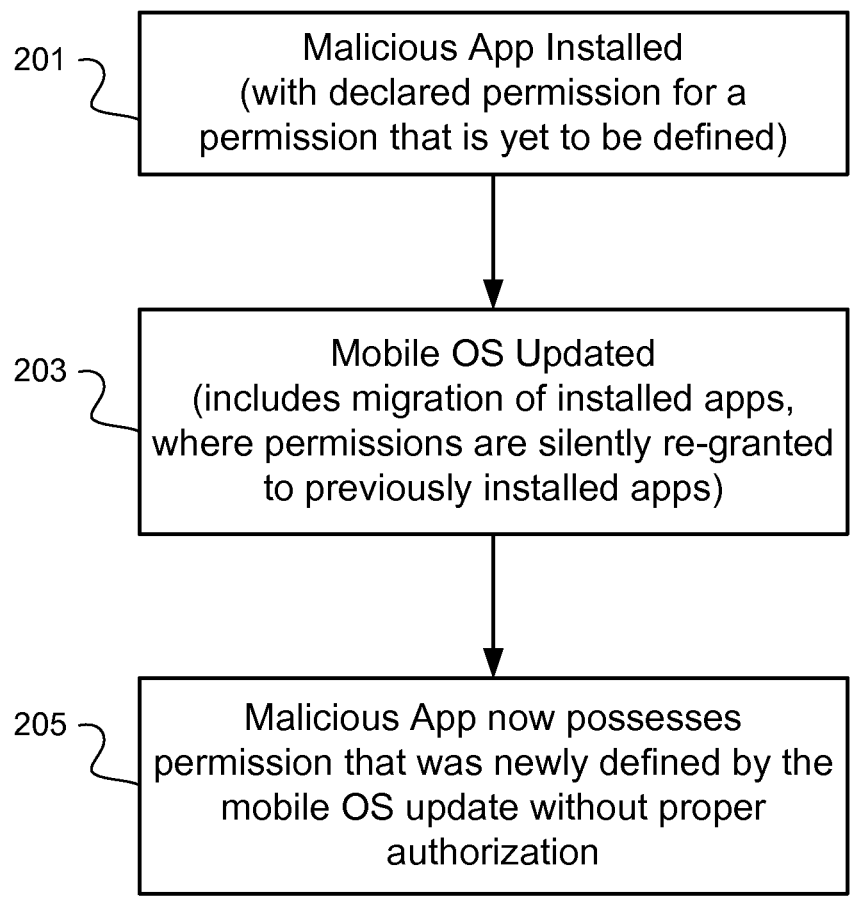
FIGS. 2A-2E are flowcharts illustrating exemplary processes for different pileup attacks.
Figure 2B:
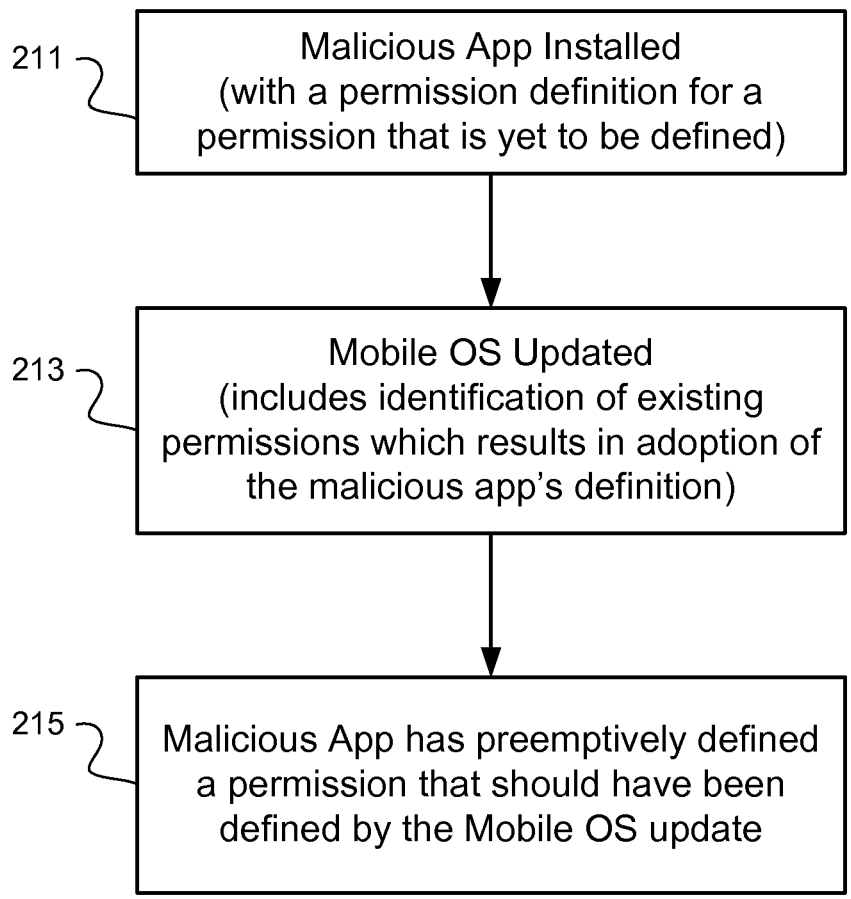

FIG. 2A illustrates a process for a "permission harvesting" attack, and FIG. 2B illustrates a process for a "permission preempting" attack. As mentioned above, each app has its own set of permissions and privileges within the system. In an exemplary embodiment, these permissions and privileges are categorized into different protection levels. For example, in the Android system, common protection levels include: normal (automatically granted to apps when requested by the apps), dangerous (granted to an app only upon user consent), signature (granted to apps signed with the same certificate as one that already declares the permission), system (granted to system apps), and signature or system (a combination of signature and system protection that is granted to system apps or apps signed with the same certificate). The "permission harvesting" attack of FIG. 2A allows a malicious app to gain dangerous-level permissions without user consent, and the "permission preempting" attack of FIG. 2B allows a malicious app to tamper with the definitions of new permissions and, for example, thereby gain any level of permission (including signature-, system- and/or signature or system-level permissions).

In FIG. 2A, the process starts with installation of a malicious app on a current version of the mobile OS (stage 201). The malicious app has declared for itself a dangerous-level permission which has not yet been defined (and thus does not exist) on the current version of the mobile OS, but will exist on a next or future version of the mobile OS (by being newly defined during a system update). Because this permission does not yet exist on the current mobile OS, during installation of the malicious app on the current mobile OS, the installation process ignores the declaration of the dangerous-level permission, which is not recognized by the current mobile OS. Subsequently, e.g., during the update of the current mobile OS to the next version of the mobile OS (stage 203), the update results in defining the new dangerous-level permission for the next mobile OS. When apps are migrated to the next mobile OS during the update process, which includes silently re-granting dangerous-level permissions to which the apps have previously received authorization, the update mechanism assumes that the malicious app is authorized with respect to that newly defined dangerous-level permission based on its declaration that it has that dangerous-level permission. The update mechanism thus grants the malicious app the newly defined dangerous-level permission even though the user has never authorized the malicious app to have that permission. Thus, with respect to the updated mobile OS, the malicious app now possesses the dangerous-level permission without proper authorization (stage 205).

Using the "permission harvesting" form of pileup attack, a malicious app is able to gain dangerous-level permissions that are newly defined during a mobile OS update. However, in this exemplary environment, the malicious app cannot gain signature-, system- and/or signature or system-level permissions through "permission harvesting," as signature- and system-level permissions declared by system apps cannot be granted to third-party apps due to the system's rules.

The "permission preempting" attack depicted in FIG. 2B allows a malicious app to gain any permission that is newly defined during a mobile OS update, regardless of the protection level associated therewith (the malicious app can even get permissions that are to be defined as system-level or signature-level permissions). The process starts with installation of a malicious app on a current version of the mobile OS (at stage 211), where instead of simply declaring that it has a particular permission, the malicious app preemptively defines a permission for the current mobile OS using the same name/identification for the permission as a future permission to be newly defined in a next version of the mobile OS. During the update of the current mobile OS to the next version of the mobile OS (stage 213), the update mechanism identifies existing permissions on the current mobile OS and places them into a permissions list (including the permission defined by the malicious app). When the update mechanism gets to the point in the process where it should be adding the newly defined permission in the system update package to the permissions list, it instead determines that this intended newly defined permission has in fact already been defined, and as a result skips over the step of adding the proper definition for the new permission from the system update package. Thus, on the next version of the mobile OS, the permission that should have been newly defined is instead defined by the malicious app (stage 215), which could have defined that permission as having a normal-level of protection when it should have been at a higher level of protection according to the system update package. Alternatively, the malicious app could define a permission that should have been normal-level at a higher level, such that other apps that should have had the permission are now denied that permission.

This "permission preempting" attack allows a malicious app to gain access to resources that should have been protected with a dangerous-, system-, signature- or system or signature-level rating, or alternatively to deny access to resources by specifying a relatively higher level of protection. Moreover, because the permission is defined by the malicious app, deleting the malicious app from the mobile OS will also cause the permission definition to be deleted from the mobile OS, such that the permission becomes unavailable across the whole system and no apps are able to gain access to the resources associated with that permission.

Figure 2C:
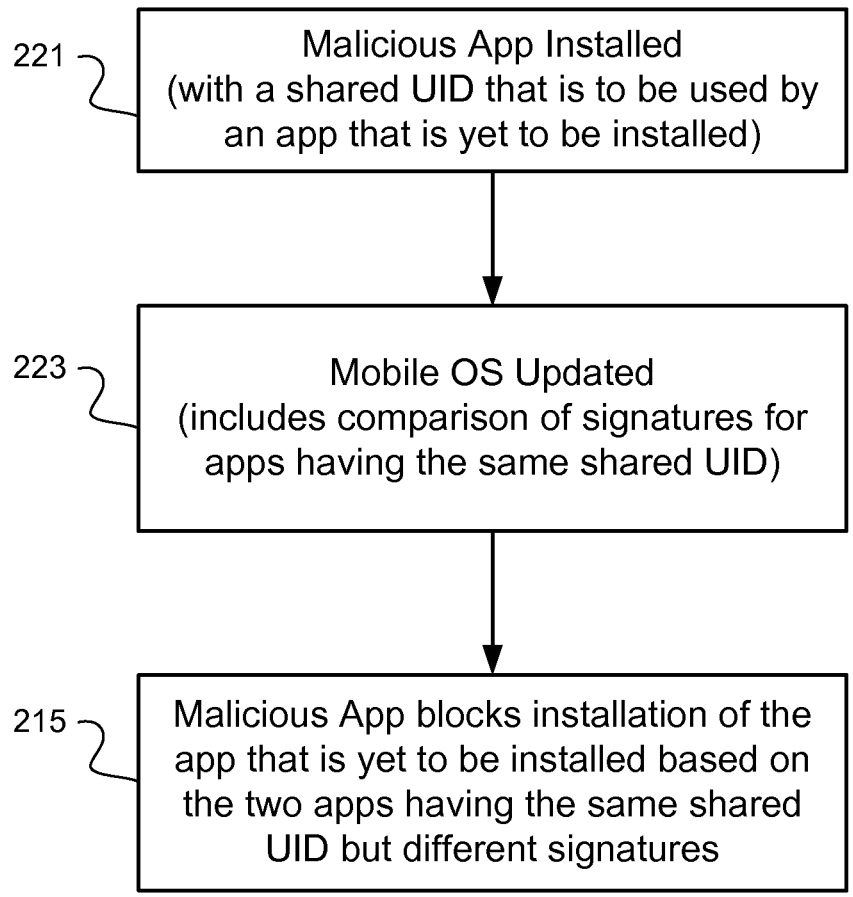

FIG. 2C illustrates a process for a "shared UID grabbing" attack. As mentioned above, certain apps may have shared UIDs, which allows the apps to access each other's data and potentially execute in a same process. The "shared UID grabbing" attack starts with a malicious app being installed, with the malicious app having a shared UID entry that matches a shared UID entry of a future app that is yet to be installed (e.g., a system app utilizing the shared UID that is to be installed during a future or next mobile OS update) (stage 221). During the update of the mobile OS, when the updating mechanism encounters two application packages with the same shared UID, the updating mechanism checks to verify that the app signatures are signed by the same party (stage 223). In the case of the malicious app sharing the same shared UID as a to-be-installed system app, this results in the malicious app blocking the installation of the to-be-installed system app (stage 225) since the malicious app and the to-be-installed system app are not signed by the same party.

In an exemplary environment, the "shared UID grabbing" attack may further allow the existing malicious app the opportunity to replace the to-be-installed system app with a malicious app. During the mobile OS update process, the updating mechanism replaces all application package files under the system directory with new corresponding application packages. However, during transition of a previously installed system app (not having a shared UID) to an updated system app (having a shared UID) where an existing malicious app grabs the shared UID, the previously installed system app is deleted and installation of the updated system app is blocked. This presents the opportunity for the existing malicious app to download a malicious replacement app to pose as the new system app that should have been installed.

Figure 2D:
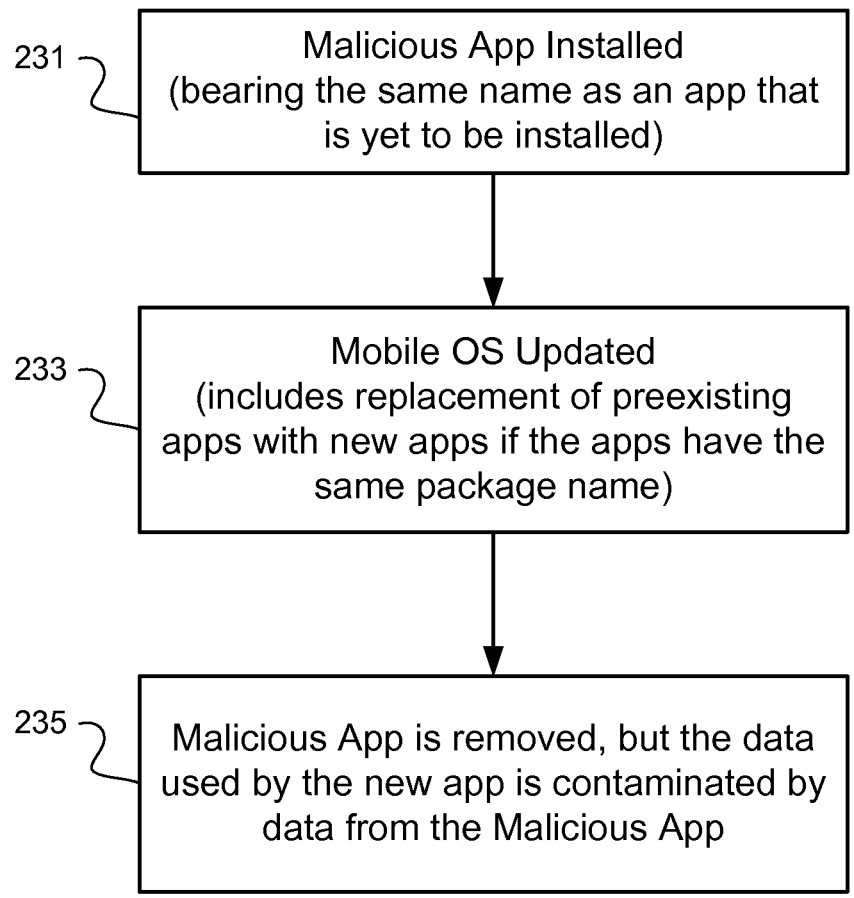

FIG. 2D illustrates a process for a "data contamination" attack. The "data contamination" attack allows a malicious application to contaminate the data that is to be used by a future app. The process begins with installation of a malicious app, where the malicious app utilizes an application package name that is the same as a future app to be installed (stage 231). Because there are legitimate instances where preexisting non-system applications bear the same name as new system applications to be installed as part of an update (e.g., in the case of a non-system app developed by the system provider being released first through an app store and later incorporated into the system itself), the mobile OS update process seeks to preserve data from preexisting apps bearing the same application package name even where there is a new app with that same name being installed as part of a mobile OS update (stage 233). Thus, when a malicious app adopts the same name as a future app to be installed, the preexisting data provided by the malicious app is incorporated as data to be used by the future app (stage 235), thereby contaminating the data of the future app.

For "data contamination" attacks, the malicious app no longer exists on the system after the update of the mobile OS is completed. However, the data associated with the legitimate app that replaced the malicious app has been contaminated by the malicious app. In certain exemplary environments, it should be noted that this "data contamination" attack may not work with respect to apps having shared UIDs (since the installation process for new apps having shared UIDs may be different from the installation process for new apps that do not have shared UIDs).

Figure 2E:
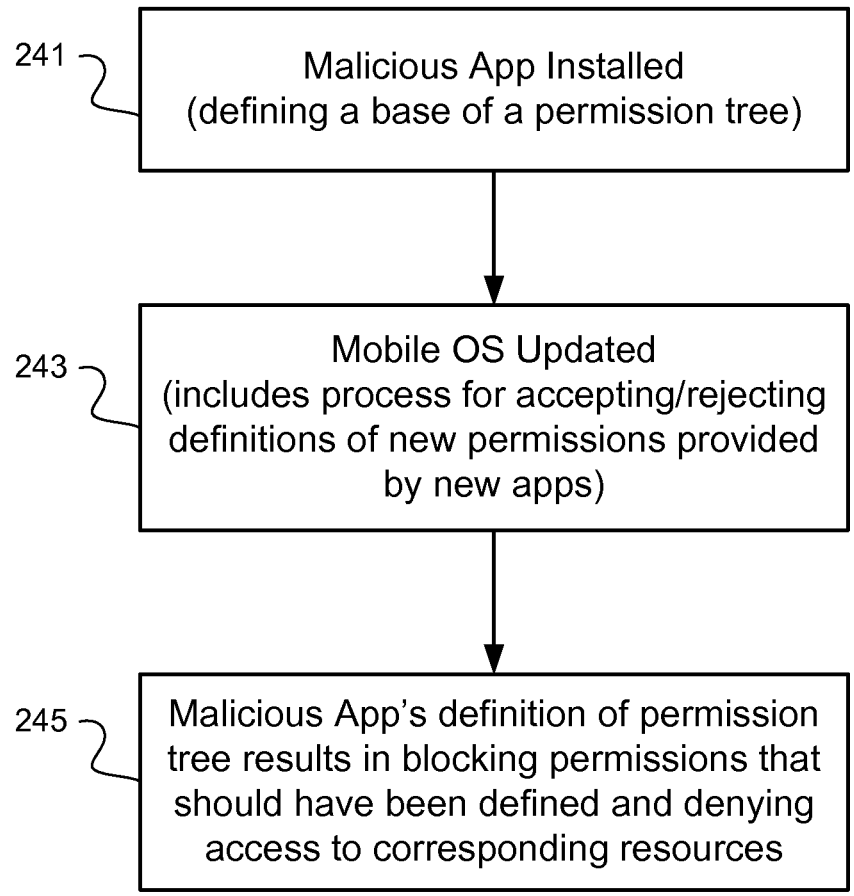

FIG. 2E illustrates a process for a "denial of services" attack based on the use of permission trees. The attack begins with installation of a malicious app that defines a permission tree, which is a base name (root) for a tree of permissions, where the tree of permissions contains permissions that are to-be-defined in a future mobile OS update (stage 241). For example, the malicious app could define a new base/root of "com.example", which corresponds to a tree containing permissions such as "com.example.math1", "com.example.math1.add", "com.example.math2", etc. During the update of the mobile OS, new apps to be installed attempt to define new permissions that are part of the tree defined by the malicious app (stage 243). However, because the entire tree has previously been defined by the malicious app, these definitions of new permissions that are part of the tree are rejected due to those new permissions being declared by new apps which are part of a different application package from the application package that had declared the tree. This results in denial of access to the resources guarded by the permissions that should have been defined but were blocked by the malicious app's definition of the permission tree (stage 245).

This "denial of services" attack may work even if there are preexisting apps that already define permissions and/or permission trees that are subsets of the permission tree defined by the malicious app. For example, using the example above, even if an existing system app had defined the permission tree "com.example.math1", the malicious app can subsequently define the permission tree "com.example" to perform the denial of services attack with respect to all new apps registering permissions that are part of the "com.example" tree, even those that are part of the preexisting "com.example.math1" sub-tree.

In an exemplary Android-based environment, the updating mechanism performing the update-related tasks discussed above with respect to FIGS. 2A-2E is a Package Manager Service (PMS) for installing, upgrading, configuring, and removing application packages. However, it will be appreciated that other parts of the Android system, such as the Activity Manager, Service Manager, User Manager Service, Input Manager, etc., may be involved in these update processes as well. Further, it will be appreciated that other exemplary embodiments of the invention may be implemented in the context of updates to mobile OS environments other than Android as well.

Each of the potential pileup attacks discussed above with respect to FIGS. 2A-2E corresponds to logical flaws in mobile OS update processes (referred to herein as "pileup flaws"). Because there are several different types of mobile OSes (e.g., Android, iOS, Windows, etc.), and potentially thousands of mobile OS manufacturer-specific and/or device-specific configurations (e.g., even considering just Android systems, each smartphone manufacturer has customized configurations of the Android mobile OS, often with further specific customizations on a device-by-device basis), certain pileup attacks identified above may be applicable to certain mobile OS configurations (or versions of those configurations) while not being applicable to certain other mobile OS configurations (or versions of those configurations). Thus, in certain exemplary embodiments of the invention, a first aspect of the system is to identify which pileup flaws correspond to which mobile OS configurations and to which versions of those configurations. Alternatively, in other exemplary embodiments of the invention, it may simply be assumed that every kind of pileup flaw is present in every mobile OS configuration and version.

In accordance with embodiments of the invention, based on the pileup flaws corresponding to each mobile OS configuration, pileup exploit opportunities can be identified on the basis of those pileup flaws corresponding to each version of each mobile OS configuration. For example, for a particular mobile OS configuration (e.g., a particular device-specific mobile OS having multiple versions), each successive mobile OS update may be analyzed to determine which items in each mobile OS update are susceptible to pileup attacks. In a particular example, given that the mobile OS starts with version 1, newly defines a permission x when updated to version 2, and then newly defines a permission y when updated to version 3, it can be seen, for example, that version 1 of the OS is vulnerable to a permission harvesting attack with respect to permissions x and y, and that version 2 of the OS is vulnerable to a permission harvesting attack with respect to permission y.

A comprehensive record of identified pileup exploit opportunities corresponding to each mobile OS configuration and version thereof is stored at a risk database, which is accessible over a wireless connection to a scanner application stored at a mobile device. According to embodiments of the invention, the scanner application is configured to determine the version and configuration of the mobile OS installed at the mobile device, and to query the risk database for identified exploit opportunities corresponding to the version and configuration of the mobile OS installed at the mobile device. The scanner application then uses this information to scan third-party (i.e., non-system) apps installed on the mobile device to detect whether any of the third-party apps contains items corresponding to susceptible items that were identified as exploit opportunities (e.g., third-party apps that include permission declarations, permission definitions, permission tree definitions, shared UID entries, and/or package names that conflict with permission declarations, permission definitions, permission tree definitions, shared UID entries, and/or package names corresponding to a future mobile OS update). Upon completion of the scan, the scanner app reports the results to the user of the mobile device and/or takes further appropriate action (e.g., removing apps identified as being malicious apps).

Figure 3:
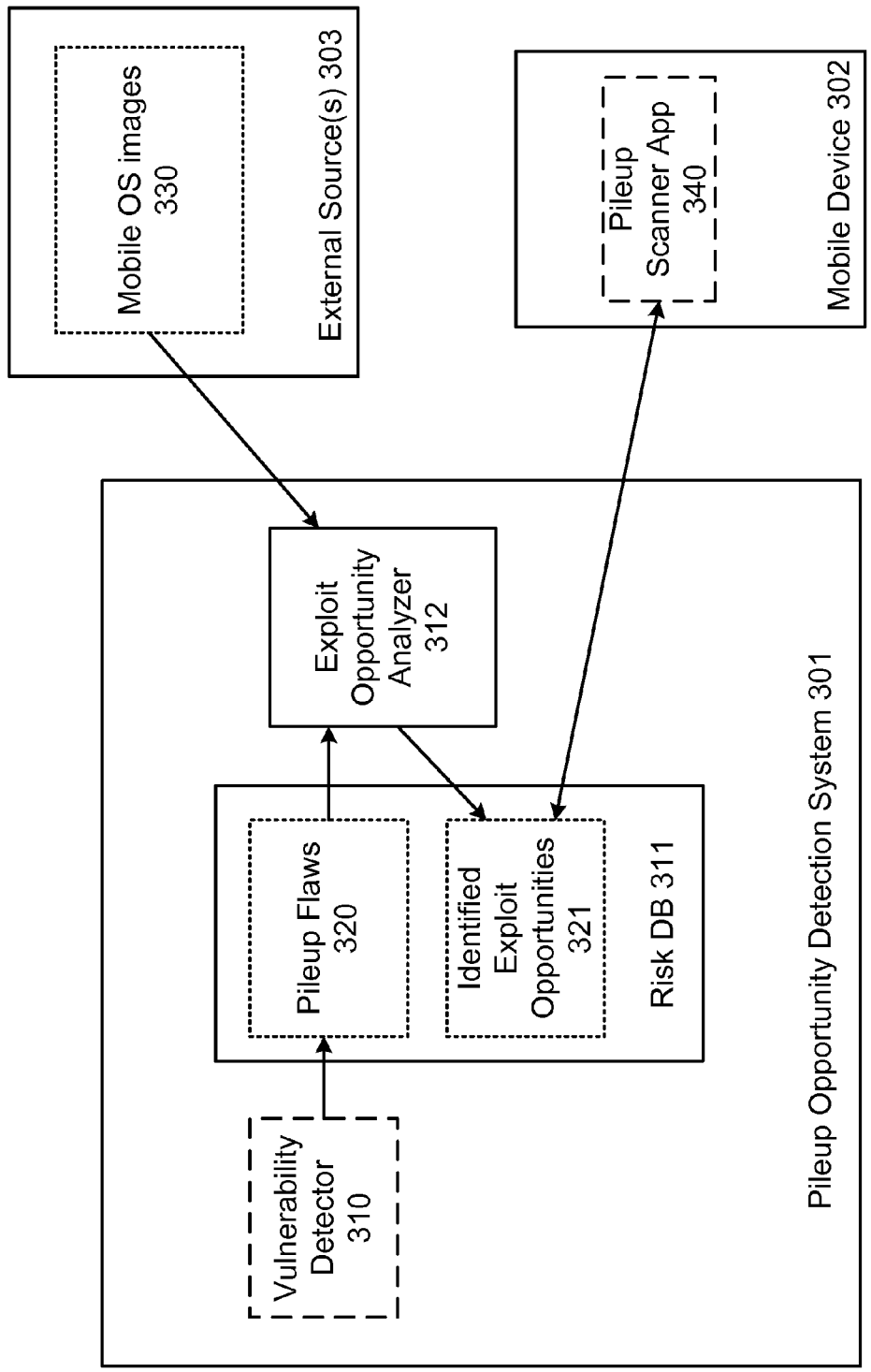
FIG. 3 is a block diagram illustrating an exemplary system architecture.

FIG. 3 is a block diagram illustrating an exemplary system architecture in an exemplary embodiment of the invention. The architecture includes a pileup opportunity detection system 301, which may, for example, be server-based and include a risk database 311, and further include one or more computing devices corresponding to a vulnerability detector 310 and an exploit opportunity analyzer 312. The architecture further includes external source(s) 303 from which the exploit opportunity analyzer 312 obtains various mobile OS images 330 corresponding to different mobile OS configurations and versions thereof (which the exploit opportunity analyzer 312 uses in combination with information regarding pileup flaws 320 stored at the risk database 311 to identify exploit opportunities). The architecture also further includes a mobile device 302 that has a pileup scanner app 340 installed.

The information regarding pileup flaws 320 corresponding to each mobile OS configuration allows the exploit opportunity analyzer 312 to determine what items to look for in each mobile OS update corresponding to that mobile OS configuration. For example, with respect to permission harvesting, permission preempting, and denial of service attacks, the exploit opportunity analyzer 312 identifies the names of new permissions introduced by mobile OS updates (and the point at which each new permission is introduced). With respect to shared UID and data contamination attacks, the exploit opportunity analyzer 312 identifies the names of new application packages and shared UID entries corresponding thereto (if applicable) introduced by mobile OS updates (and the point at which each new application package is updated). In this manner, the exploit opportunity analyzer 312 is able to comprehensively identify where exploit opportunities for each mobile OS configuration may be found. Using this pileup flaw information 320 in combination with particular mobile OS images 330 retrieved from external source(s) 303, the exploit opportunity analyzer 312 is able to identify, for example, new permissions (and the base/roots thereof), shared UIDs, and application package names introduced in each successive version of each manufacturer-specific/device-specific mobile OS configuration (for example, by comparing the mobile OS images 330 to one another to identify differences, or by identifying new items defined within mobile OS update packages). Identifications of the particular items that are identified as being susceptible to pileup attacks are stored as identified exploit opportunities 321 in the risk database 311.

Figure 4:
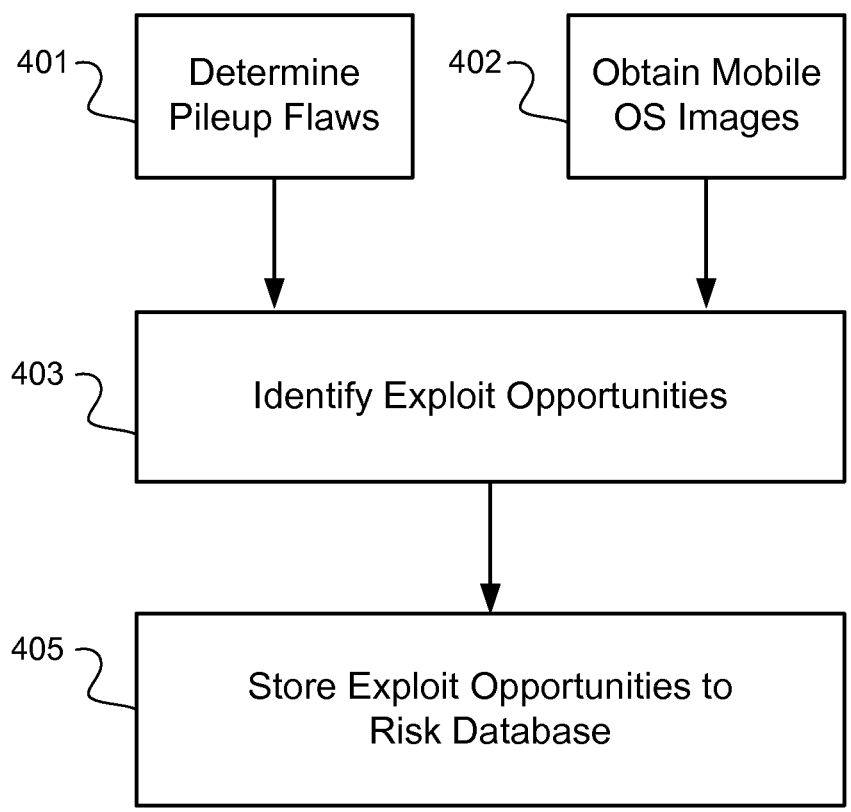
FIG. 4 is a flowchart illustrating an exemplary process for identifying pileup exploit opportunities.

FIG. 4 is a flowchart illustrating this process for identifying exploit opportunities for a particular mobile OS configuration, as discussed above with reference to FIG. 3. At stages 401 and 402, the exploit opportunity analyzer computing device obtains information regarding pileup flaws for a particular mobile OS configuration (e.g., by accessing pileup flaws 320 from the risk database 311 or by relying on an assumption that all potential pileup flaws are applicable to a particular mobile OS configuration), and obtains mobile OS images corresponding to different versions of the mobile OS configuration. At stage 403, based on the information regarding the pileup flaws for that mobile OS configuration and the obtained mobile OS images, the exploit opportunity analyzer identifies exploit opportunities by identifying particular items that are susceptible to pileup attacks (e.g., new permission definitions, new shared UIDs, and new package names) as well as identifying the point at which such items present exploit opportunities (i.e., prior to the new items being added via updates). These identifications of exploit opportunities are then stored to the risk database at stage 405.

Turning back to FIG. 3, given a set of identified exploit opportunities 321 stored at the risk database 311, the pileup scanner app 340 can be deployed at mobile devices such as the mobile device 302. The pileup scanner app 340 determines the version and configuration of the mobile OS installed at the mobile device, and queries the risk database 311 for identified exploit opportunities 321 corresponding to the version and configuration of the mobile OS installed at the mobile device. The scanner app 340 then uses this information to scan the non-system apps installed on the mobile device to detect whether any of these apps contains items corresponding to susceptible items that were identified as exploit opportunities. Upon completion of the scan, the scanner app 340 reports the results to the user of the mobile device (e.g., using a human-machine interface of the device such as the display and speakers) and/or takes further appropriate action such as distinguishing between legitimate apps versus malicious apps detected by the scan as utilizing items susceptible to pileup attacks (e.g., by cross-checking the detected app against a list of legitimate non-system apps or checking a signature of the non-system app), and/or removing apps identified as being malicious apps.

Figure 5:
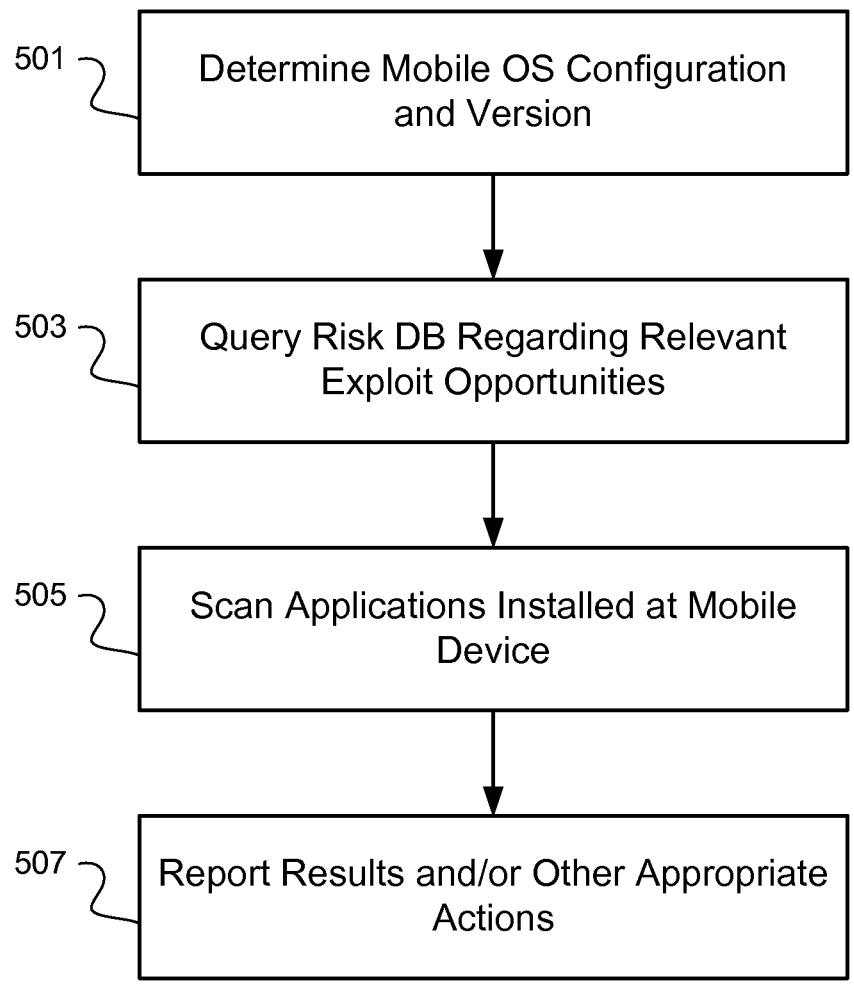
FIG. 5 is a flowchart illustrating an exemplary process for scanning a mobile device for pileup vulnerabilities.

FIG. 5 is a flowchart illustrating this process for scanning the mobile device for pileup vulnerabilities as discussed above with reference to FIG. 3. At stage 501, the scanner app determines the mobile OS configuration and version of the mobile OS installed at the mobile device. At stage 503, the scanner app queries the risk database regarding exploit opportunities relevant to the determined mobile OS configuration and version. At stage 505, the scanner app scans non-system apps installed at the mobile device based on the identified exploit opportunities received from the risk database. For example, in an embodiment, if the risk database indicates a new permission to be defined in a future mobile OS version corresponding to that mobile OS configuration as an exploit opportunity, the scanner identifies any non-system app installed on the mobile device that declares the new permission, defines the new permission, or defines a base or root relative to the new permission. Similarly, in another example, if the risk database indicates a new application package with no shared UID and/or a new application package with a shared UID to be installed in a future version of the mobile OS configuration as an exploit opportunity, the scanner identifies any non-system app installed on the mobile device that uses the same package name as the new application package (with respect to the new application package with no shared UID) and/or any non-system app installed on the mobile device that has the same shared UID as the new application package with the shared UID. At stage 507, the results of the scan may be provided to the user, and/or other appropriate action may be taken (such as removal of malicious apps).

In an exemplary embodiment, the scanner app is a non-system app available for download, for example, through app distribution avenues such as an app store. In another exemplary embodiment, the scanner app is a system app, for example, that is utilized as a part of each mobile OS update process to remove malicious apps intending to perform pileup attacks before such malicious apps can execute those attacks.

Turning back to FIG. 3, as mentioned above, it may simply be assumed that each potential pileup flaw applies to every mobile OS configuration. In this case, it will be appreciated that the information regarding pileup flaws 320 does not necessarily need to be stored in a risk database. The exploit opportunity analyzer 312 can be configured such that it simply assumes that every type of potential update flaw (e.g., as discussed above with respect to FIGS. 2A-2E) is present in the update logic used for each version of each mobile OS configuration, and identifies exploit opportunities corresponding thereto.

In certain embodiments, a vulnerability detector 310 is used to identify update flaws in the update mechanisms used for each version of each mobile OS configuration through a computer-implemented flaw detection process. The vulnerability detector 310 utilizes code comparison and code verification tools to identify whether or not certain logical flows are present in the computer code corresponding to the update mechanism used for mobile OS updates. For example, by annotating a reference set of update mechanism code (e.g., the PMS code for an Android mobile OS image) with appropriate annotations and assertions, the vulnerability detector 310 can determine whether or not the update procedure utilized for that mobile OS configuration and version contains particular pileup flaws. Additionally, by doing a differential computation between different versions of the update mechanism code, the vulnerability detector 310 can quickly and efficiently determine whether such flaws are carried through successive iterations of the update mechanism code. Alternatively, flaws may also be identified manually via examination of the code for mobile OS update mechanisms.

A compilation of information regarding pileup flaws 320 can thus be built and stored in risk database 311, such that the exploit opportunity analyzer 312 is able to access the risk database 311 to determine which flaws are present in each version of each mobile OS configuration. This allows the exploit opportunity analyzer 312 to know, in particular, which items it needs to look for. For example, for a particular version of a particular mobile OS configuration where the "shared UID grabbing" and "data contamination" attacks are not possible due to the use of an update procedure for that mobile OS configuration/version that precludes such attacks, the exploit opportunity analyzer 312 would not consider new shared UIDs or new application package names introduced by future mobile OS updates as exploit opportunities.

Further details and experimental data regarding a particular exemplary implementation of the vulnerability detector, risk database, and scanner app in the context of various configurations of the Android mobile OS are provided in the Xing Publication. As can be seen from the results presented therein, embodiments of the invention are able to comprehensively identify a plurality of pileup-related exploit opportunities, and to utilize the scanner app to successfully identify and remove malicious apps with precision and speed.

It will be appreciated by those of skill in the art that the execution of various computer-implemented processes and steps described herein may occur via the computerized execution of processor-executable instructions stored on a tangible computer-readable medium, e.g., RAM, ROM, PROM, volatile, nonvolatile, or other electronic memory mechanism. Thus, for example, operations performed by the mobile device may be carried out according to processor-executable instructions and applications installed at the mobile device, and operations performed by the exploit opportunity analyzer computing device may be carried out according to processor-executable instructions and applications installed at the exploit opportunity analyzer device.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for detecting pileup vulnerabilities corresponding to mobile operating system updates, the system comprising:

an exploit opportunity analyzer, configured to be executed by a processor of a server, configured to identify pileup exploit opportunities corresponding to a plurality of mobile operating system configurations based on mobile operating system upgrades for each of the plurality of mobile operating system configurations, wherein the identification of exploit opportunities is based on information relating to pileup flaws;

a risk database, comprising a non-transitory memory, configured to store information regarding the identified pileup exploit opportunities for a plurality of versions of each of the plurality of mobile operating system configurations; and a scanner application, configured to be executed by a processor of a mobile device, configured to query identified exploit opportunities relating to a particular mobile operating system configuration and version, and to evaluate third-party applications installed at the mobile device based on the identified exploit opportunities.

2. The system according to claim 1, wherein the pileup flaws include permission harvesting flaws corresponding to a malicious app being able to gain a permission to be defined in a mobile operating system update without receiving proper authorization for gaining the permission.

3. The system according to claim 1, wherein the pileup flaws include permission preempting flaws corresponding to a malicious app being able to preemptively define a new permission that corresponds to a permission to be defined in a mobile operating system update.

4. The system according to claim 1, wherein the pileup flaws include shared user ID (UID) grabbing flaws corresponding to a malicious app being able to declare a shared UID corresponding to a shared UID of an application to be added by a mobile operating system update so as to block installation of the application to be added.

5. The system according to claim 1, wherein the pileup flaws include data contamination flaws corresponding to a malicious app being able to contaminate data for an application to be added by a mobile operating system update via the mobile operating system update process.

6. The system according to claim 1, wherein the pileup flaws include denial of services flaws corresponding to a malicious app being able to define a permission tree so as to deny access to resources associated with a permission to be defined by a mobile operating system update that falls within the permission tree defined by the malicious app.

7. The system according to claim 1, further comprising:
a vulnerability detector, configured to analyze mobile operating system update logic used by particular mobile operating system configurations to identify pileup flaws associated with each particular mobile operating system configuration; and
wherein the risk database is further configured to store the information relating to the pileup flaws and the exploit opportunity analyzer is further configured to obtain the stored information relating to the pileup flaws from the risk database.

8. The system according to claim 1, wherein the exploit opportunity analyzer is further configured to receive mobile operating system images corresponding to different versions for a mobile operating system configuration and analyze pileup exploit opportunities based on the pileup flaws and based on differences between the difference versions of the mobile operating system configuration.

9. The system according to claim 8, wherein the risk database is further configured to store information relating to the pileup flaws and the exploit opportunity analyzer is further configured to obtain the stored information relating to the pileup flaws for the mobile operating system configuration from the risk database, and wherein the analysis of pileup exploit opportunities is further based on the obtained information relating to the pileup flaws for the mobile operating system configuration.

10. The system according to claim 1, wherein the scanner application is further configured to remove a third-party application based on a result of the scanner application's evaluation of the third-party application.

11. A method for identifying pileup exploit opportunities associated with a plurality of mobile operating system configurations, the method comprising:
receiving, by a computing device, a plurality of mobile operating system images corresponding to the plurality of mobile operating system configurations and multiple versions of the plurality of mobile operating system configurations;
identifying, by the computing device, items susceptible to pileup flaws in each of a plurality of the multiple versions of the plurality of mobile operating system configurations; and
causing, by the computing device, identifications of the items susceptible to pileup flaws to be stored in a risk database as identified exploit opportunities.

12. The method according to claim 11, wherein the pileup flaws include:
permission harvesting flaws corresponding to a malicious app being able to gain a permission to be defined in a mobile operating system update without receiving proper authorization for gaining the permission;
permission preempting flaws corresponding to a malicious app being able to preemptively define a new permission that corresponds to a permission to be defined in a mobile operating system update;
shared user ID (UID) grabbing flaws corresponding to a malicious app being able to declare a shared UID corresponding to a shared UID of an application to be added by a mobile operating system update so as to block installation of the application to be added;
data contamination flaws corresponding to a malicious app being able to contaminate data for an application to be added by a mobile operating system update via the mobile operating system update process; and
denial of services flaws corresponding to a malicious app being able to define a permission tree so as to deny access to resources associated with a permission to be defined by a mobile operating system update that falls within the permission tree defined by the malicious app.

13. The method according to claim 11, further comprising:
receiving, from the risk database, information relating to pileup flaws corresponding to each of the plurality of mobile operating system configuration.

14. The method according to claim 13, wherein identifying items susceptible to pileup flaws in each of a plurality of the multiple versions of the plurality of mobile operating system configurations is based on the received information relating to pileup flaws.

15. A non-transitory processor-readable medium having processor-executable instructions stored thereon for scanning for pileup vulnerabilities on a mobile device, the processor-executable instructions, when executed by a processor of the mobile device in accordance with a scanning application, facilitating the performance of the following steps:
querying a remote risk database for pileup exploit opportunities corresponding to a current version of a mobile operating system installed on the mobile device;

receiving identifications of pileup exploit opportunities corresponding to the current version of the mobile operating system;

scanning non-system applications installed on the mobile device to detect potentially malicious applications configured to take advantage of the pileup exploit opportunities corresponding to the current version of the mobile operating system; and responding to detected potentially malicious applications by notifying a user of the mobile device of the detected potentially malicious applications or by removing the potentially malicious applications from the mobile device.

16. The non-transitory processor-readable medium according to claim 15, wherein the identifications of pileup exploit opportunities include pileup exploit opportunities associated with permission harvesting flaws corresponding to a malicious app being able to gain a permission to be defined in a mobile operating system update without receiving proper authorization for gaining the permission.

17. The non-transitory processor-readable medium according to claim 15, wherein the identifications of pileup exploit opportunities include pileup exploit opportunities associated with permission preempting flaws corresponding to a malicious app being able to preemptively define a new permission that corresponds to a permission to be defined in a mobile operating system update.

18. The non-transitory processor-readable medium according to claim 15, wherein the identifications of pileup exploit opportunities include pileup exploit opportunities associated with shared user ID (UID) grabbing flaws corresponding to a malicious app being able to declare a shared UID corresponding to a shared UID of an application to be added by a mobile operating system update so as to block installation of the application to be added.

19. The non-transitory processor-readable medium according to claim 15, wherein the identifications of pileup exploit opportunities include pileup exploit opportunities associated with data contamination flaws corresponding to a malicious app being able to contaminate data for an application to be added by a mobile operating system update via the mobile operating system update process.

20. The non-transitory processor-readable medium according to claim 15, wherein the identifications of pileup exploit opportunities include pileup exploit opportunities associated with denial of services flaws corresponding to a malicious app being able to define a permission tree so as to deny access to resources associated with a permission to be defined by a mobile operating system update that falls within the permission tree defined by the malicious app.

* * * * *